United States Patent
Yi et al.

(10) Patent No.: US 9,432,847 B2
(45) Date of Patent: Aug. 30, 2016

(54) METHOD AND APPARATUS FOR RECONFIGURING CONNECTION TO BASE STATION AT RELAY NODE IN A WIRELESS COMMUNICATION SYSTEM

(75) Inventors: Seungjune Yi, Anyang-si (KR); Sungduck Chun, Anyang-si (KR); Sunghoon Jung, Anyang-si (KR); Youngdae Lee, Anyang-si (KR); Sungjun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

(21) Appl. No.: 13/816,558

(22) PCT Filed: Oct. 24, 2011

(86) PCT No.: PCT/KR2011/007928
§ 371 (c)(1),
(2), (4) Date: Feb. 12, 2013

(87) PCT Pub. No.: WO2012/060565
PCT Pub. Date: May 10, 2012

(65) Prior Publication Data
US 2013/0148490 A1    Jun. 13, 2013

Related U.S. Application Data

(60) Provisional application No. 61/410,319, filed on Nov. 4, 2010, provisional application No. 61/411,443, filed on Nov. 8, 2010.

(51) Int. Cl.
*H04L 1/00*    (2006.01)
*H04W 12/10*    (2009.01)
(Continued)

(52) U.S. Cl.
CPC ............... *H04W 12/10* (2013.01); *H04B 7/155* (2013.01); *H04W 76/028* (2013.01)

(58) Field of Classification Search
CPC ..... H04L 41/0654; H04L 45/28; H04L 45/22; H04L 69/40; H04L 47/34; H04L 49/90; H04L 47/10; H04L 49/00; H04L 49/901; H04L 65/1069; H04L 67/141; H04L 65/1006; H04L 67/14; H04W 24/04; G06F 15/16
USPC .................... 370/216, 394; 709/227
See application file for complete search history.

(56) References Cited

U.S. PATENT DOCUMENTS

| | | | | |
|---|---|---|---|---|
| 2008/0064390 | A1* | 3/2008 | Kim | H04W 60/00 455/425 |
| 2008/0123655 | A1* | 5/2008 | Kim | H04L 1/1867 370/394 |
| 2009/0163211 | A1 | 6/2009 | Kitazoe et al. | |

(Continued)

FOREIGN PATENT DOCUMENTS

| | | |
|---|---|---|
| EP | 2 247 151 A2 | 11/2010 |
| KR | 10-2010-0103622 A | 9/2010 |

*Primary Examiner* — Andrew Chriss
*Assistant Examiner* — Atique Ahmed
(74) *Attorney, Agent, or Firm* — Birch, Stewart, Kolasch & Birch, LLP

(57) ABSTRACT

The present invention relates to a method of processing a signal in a wireless communication system. In particular, the method comprises steps of setting an indicator indicating that an integrity failure occurs and transmitting a first message associated with a connection reestablishment including the indicator to a network. The integrity failure means that data is inserted or replaced by an unauthorized third party.

9 Claims, 9 Drawing Sheets

(51) Int. Cl.
*H04B 7/155* (2006.01)
*H04W 76/02* (2009.01)

(56) References Cited

U.S. PATENT DOCUMENTS

| | | | |
|---|---|---|---|
| 2009/0175163 A1* | 7/2009 | Sammour | H04W 80/02 370/216 |
| 2009/0238129 A1* | 9/2009 | Park | H04W 76/041 370/329 |
| 2009/0320100 A1* | 12/2009 | Kitazoe | H04L 63/20 726/3 |
| 2010/0246382 A1 | 9/2010 | Yi et al. | |
| 2010/0329216 A1* | 12/2010 | Jen | H04B 7/2606 370/332 |

* cited by examiner (a) contol - plane protocol stack (b) user - plane protocol stack

METHOD AND APPARATUS FOR RECONFIGURING CONNECTION TO BASE STATION AT RELAY NODE IN A WIRELESS COMMUNICATION SYSTEM

CROSS REFERENCE TO RELATED APPLICATIONS

This application is the National Phase of PCT/KR2011/007928 filed on Oct. 24, 2011, which claims priority under 35 U.S.C. 119(e) to U.S. Provisional Application No. 61/410,319 filed on Nov. 4, 2010 and 61/411,443 filed on Nov. 8, 2010, all of which are hereby expressly incorporated by reference into the present application.

TECHNICAL FIELD

The present invention relates to a wireless communication system, and more particularly, to a method and apparatus for reconfiguring a connection to a Base Station (BS) at a Relay Node (RN) in a wireless communication system.

BACKGROUND ART

A brief description will be given of a 3rd Generation Partnership Project (3GPP) Long Term Evolution (LTE) system as an example of a wireless communication system to which the present invention can be applied.

FIG. 1 illustrates the configuration of an Evolved Universal Mobile Telecommunications System (E-UMTS) network as an exemplary wireless communication system. The E-UMTS system is an evolution of the legacy UMTS system, standardization of which the 3GPP is working on. The E-UMTS is also called an LTE system.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 MHz and provides Downlink (DL) or Uplink (UL) transmission service to a plurality of UEs in the bandwidth. The eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectations of users and service providers are on the increase. Considering other radio access technologies under development, new technological evolutions are required to achieve future competitiveness. Specifically, cost reduction per bit, increased service availability, flexible use of frequency bands, a simplified structure, an open interface, appropriate power consumption of UEs, etc. are required.

DISCLOSURE OF INVENTION

Technical Problem

An object of the present invention devised to solve the problem lies on a method and apparatus for reconfiguring a connection to a Base Station (BS) at a Relay Node (RN) in a wireless communication system.

Solution to Problem

The object of the present invention can be achieved by providing a method of processing a signal in a wireless communication system, including setting an indicator indicating that an integrity failure occurs, and transmitting a first message associated with a connection reestablishment including the indicator to a network. The integrity failure means that data is inserted or replaced by an unauthorized third party.

The method may further include receiving a second message including a command for resetting at least one parameter associated with an integrity protection and resetting the at least one parameter to a predetermined value.

The at least one parameter may include a Hyper Frame Number (HFN) and a Packet Data Convergence Protocol (PDCP) Sequence Number (SN).

The predetermined value may be 0.

The predetermined value may be determined by the network.

The integrity failure may be associated with an acknowledgement mode Data Radio Bearer (DRB).

The first message may include an indication indicating an identity of radio bearer in which the integrity failure occurs.

The first message may be a Radio Resource Control (RRC) connection reestablishment request message or an RRC connection reestablishment complete message.

The second message may be an RRC connection reconfiguration message.

In another aspect of the present invention, provided herein is a method of processing a signal in a wireless communication system, including receiving a message including a command for resetting at least one parameter associated with an integrity protection, and resetting the at least one parameter to a predetermined value. The integrity failure means that data is inserted or replaced by an unauthorized third party.

Advantageous Effects of Invention

According to embodiments of the present invention, an RN can effectively reconfigure a connection to a BS.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

Reference will now be made in detail to the preferred embodiments of the present invention, examples of which are illustrated in the accompanying drawings. The embodiments of the present invention as set forth herein are examples in which the technical features of the present invention are applied to a 3rd Generation Partnership Project (3GPP) system.

While the following description is given with the appreciation that a Long Term Evolution (LTE) system and an LTE-Advanced (LTE-A) system are used, this is purely exemplary. Thus, it is to be clearly understood that the embodiments of the present invention are applicable to other communication systems. In addition, the embodiments of the present invention are described in the context of Frequency Division Duplexing (FDD). However, it is obvious that modifications can be made to the embodiments of the present invention for application to Half-FDD (H-FDD) or Time Division Duplexing (TDD).

Figure 1:
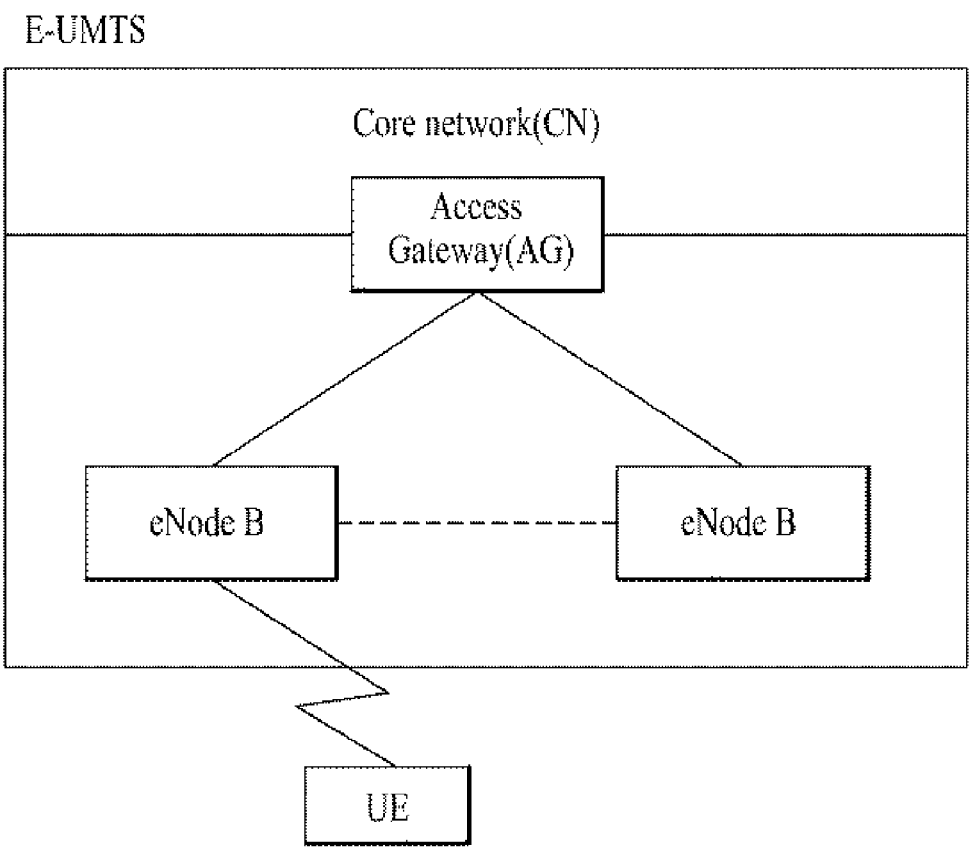
FIG. 1 illustrates the configuration of an Evolved Universal Mobile Telecommunications System (E-UMTS) network as an example of a wireless communication system.
Figure 2:
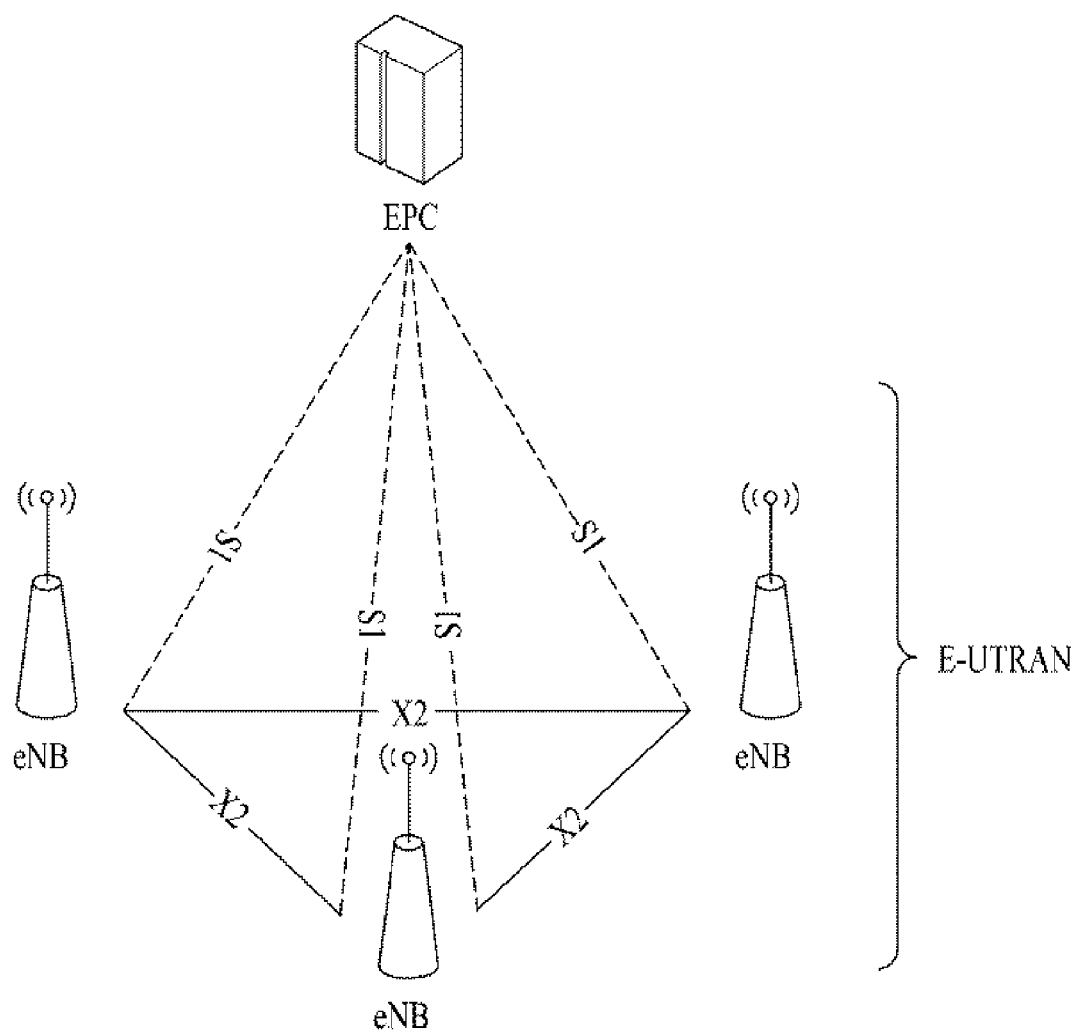
FIG. 2 conceptually illustrates the configuration of an Evolved Universal Terrestrial Radio Access Network (E-UTRAN)

FIG. 2 conceptually illustrates the configuration of an Evolved Universal Terrestrial Radio Access Network (E-UTRAN). E-UTRAN is an evolution of the legacy UTRAN system. The E-UTRAN includes evolved Node Bs (eNode Bs or eNBs) which are connected to each other via an X2 interface. An eNB is connected to a User Equipment (UE) via a radio interface and to an Evolved Packet Core (EPC) via an S1 interface.

The EPC includes a Mobility Management Entity (MME), a Serving GateWay (S-GW), and a Packet Data Network-GateWay (PDN-GW). The MME has information about connections and capabilities of UEs, mainly for use in managing the mobility of the UEs. The S-GW is a gateway having the E-UTRAN as an end point, and the PDN-GW is a gateway having a PDN as an end point.

Figure 3:
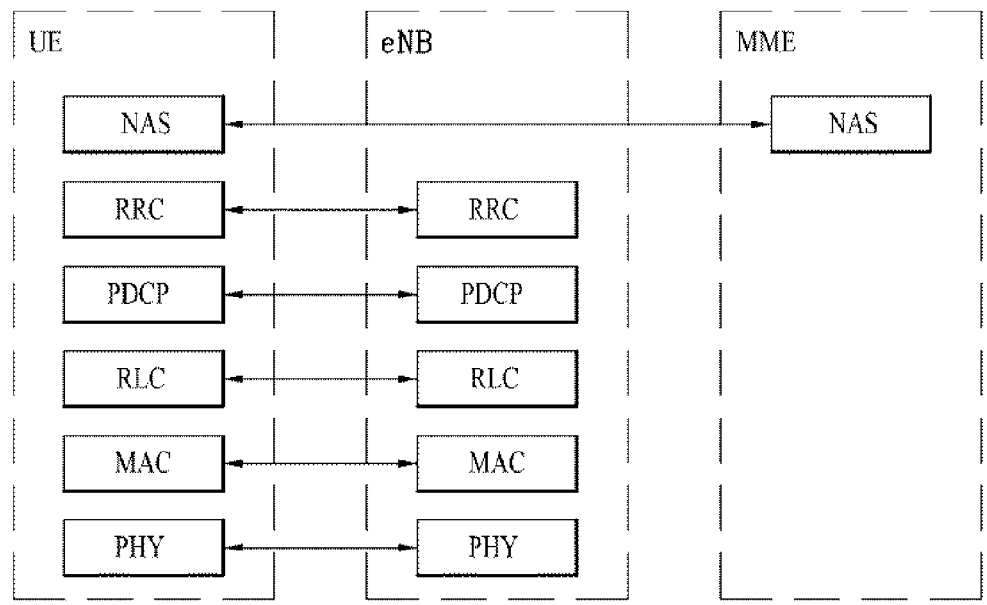
FIG. 3 illustrates a control-plane protocol stack and a user-plane protocol stack in a radio interface protocol architecture conforming to a 3rd Generation Partnership Project (3GPP) radio access network standard between a User Equipment (UE) and the E-UTRAN.
Figure 3:
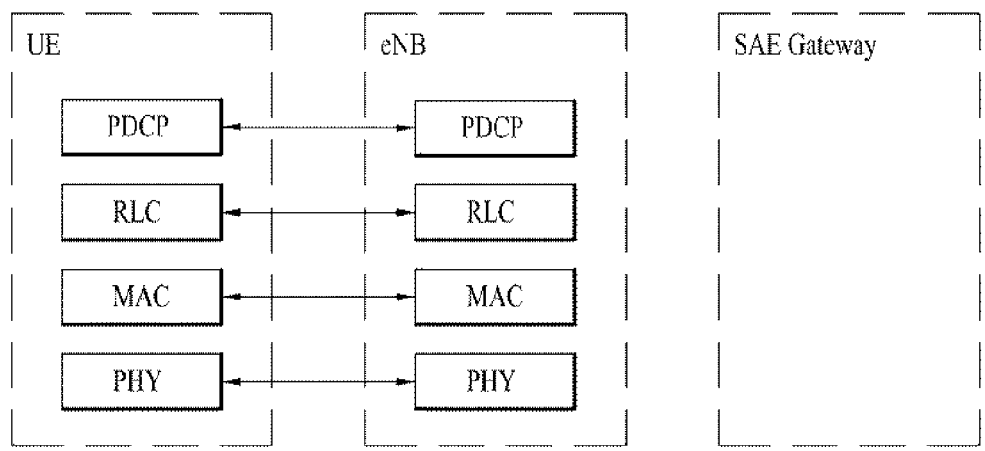

FIG. 3 illustrates a control-plane protocol stack and a user-plane protocol stack in a radio interface protocol architecture conforming to a 3rd Generation Partnership Project (3GPP) radio access network standard between a UE and the E-UTRAN. The control plane is a path in which the network and the UE transmit control messages to manage calls. The user plane is a path in which data generated from an application layer, for example, voice data or Internet packet data is transmitted.

At Layer 1 (L1), the PHYsical (PHY) layer provides information transfer service to its higher layer on physical channels. The PHY layer is connected to its higher layer, the Medium Access Control (MAC) layer through transport channels. Data is transmitted between the MAC layer and the PHY layer on the transport channels. The PHY layers of a transmitting side and a receiving side exchange data with each other on physical channels. The physical channels use time and frequency as radio resources. More specifically, the physical channels are subjected to Orthogonal Frequency Division Multiple Access (OFDMA) modulation for downlink and to Single Carrier Frequency Division Multiple Access (SC-FDMA) modulation for uplink.

The MAC layer, the Radio Link Control (RLC) layer, and the Packet Data Convergence Protocol (PDCP) layer are defined at Layer 2 (L2). The MAC layer maps various logical channels to various transport channels and performs logical channel multiplexing by mapping a plurality of logical channels to one transport channel. The MAC layer is connected to its higher layer, the RLC layer through logical channels. The logical channels are largely divided into control channels for delivering control-plane information and traffic channels for delivering user-plane information, according to the types of information carried on the logical channels.

The RLC layer at L2 adjusts a data size to be suitable for data transmission via a radio link from a lower layer by segmenting and concatenating data received from a higher layer. The RLC also provides three operation modes, Transparent Mode (TM), Un-acknowledged Mode (UM), and Acknowledged Mode (AM) in order to guarantee a variety of Quality of Service (QoS) requirements of Radio Bearers (RBs). Especially, an AM RLC performs a retransmission function by Automatic Repeat reQuest (ARQ) to render data transmission reliable.

The PDCP layer at L2 reduces the size of an Internet Protocol (IP) packet header of a relatively large size containing unnecessary control information by a header compression function in order to efficiently transmit an IP packet such as an IPv4 or IPv6 packet via a radio link having a narrow bandwidth. The header compression function enables transmission of only necessary information in a header, thereby increasing the transmission efficiency of a radio link. In addition, the PDCP layer is responsible for security in the LTE system. This security function involves ciphering for preventing a third party from eavesdropping and integrity protection for preventing a third party from maliciously modifying data.

As stated above, the functions of the PDCP layer include header compression, ciphering, integrity protection, maintenance of PDCP Sequence Numbers (SNs), etc. These functions are selectively performed according to the types of RBs. Table 1 below lists the functions of the PDCP layer. Notably, the term Data Radio Bearer (DRB) covers both AM DRB and UM DRB in Table 1.

TABLE 1

Header compression using ROHC for DRB
Security functions:
   Integrity protection for SRB
   Ciphering for SRB and DRB
Maintenance of PDCP Sequence Numbers for SRB and DRB
Handover support functions:
   Status Reporting for AM DRB
   Duplicate elimination of lower layer SDUs for AM DRB
   In-sequence delivery of upper layer PDUs for AM DRB
Timer based SDU discard for SRB and DRB The Radio Resource Control (RRC) layer at L3 is defined only on the control plane. The RRC layer takes charge of controlling logical channels, transport channels, and physical channels in relation to configuration, reconfiguration, and release of RBs. An RB is a service provided by L2, for data transmission between the UE and the UTRAN. For this purpose, the RRC layers of the UE and the UTRAN exchange RRC messages with each other.

RBs are classified into Signaling RBs (SRBs) for transmitting RRC messages on the control plane and DRBs for transmitting user data on the user plane. Depending on used RLC operation modes, the DRBs may be classified into UM DRBs using a UM RLC and AM DRBs using an AM RLC.

Now, cell selection and cell reselection will be described below.

When a UE is powered on, the UE should prepare for receiving a service by selecting a cell having an appropriate quality. In RRC idle state, the UE should select a cell having an appropriate quality and prepare for receiving a service from the cell. For example, shortly after being powered on, the UE should select a cell having an appropriate quality to register to the network. If the UE transitions from RRC connected state to the RRC idle state, the UE should select a cell in which it will stay in the RRC idle state. In this manner, the process in which a UE selects a cell satisfying a specific condition to stay in a service idle state such as the RRC idle state is called cell selection. Because cell selection is performed when a UE has not decided yet on a cell in which it will stay in the RRC idle state, it is very important to select a cell as quickly as possible. Therefore, as far as a cell offers a radio signal quality at a specific level or higher, the UE may select the cell even though the cell is not the best cell.

Once the UE selects a cell satisfying a cell selection criterion, the UE acquires information needed for operating in the RRC idle state in the cell from system information of the cell. After receiving all information required to operate in the RRC idle state, the UE requests a service to the network or waits in the RRC idle state to receive a service from the network.

After the UE selects a cell during the cell selection procedure, the strength or quality of a cell may change between the UE and an eNB due to a change in the mobility of the UE or a radio environment. If the quality of the selected cell is degraded, the UE may select another cell offering a better quality. In this case, the UE typically selects a cell that provides a better signal quality than the current cell. This process is called cell reselection. The basic purpose of cell reselection is to select a cell offering the best quality to a UE. Aside from the aspect of radio signal quality, the network may prioritize frequencies and notify the UE of the priority levels of the frequencies. Then the UE puts the priority levels of the frequencies before radio signal qualities during cell reselection.

A Random Access (RA) procedure in the LTE system will be described below. In the LTE system, there is a contention-based RA procedure and a non-contention-based RA procedure, which are distinguished depending on whether RA preambles used in the RA procedures are selected by a UE or an eNB.

In the non-contention-based RA procedure, the UE uses an RA preamble allocated directly by the eNB. Therefore, if the eNB allocates the specific RA preamble to the UE, the RA preamble is dedicated to the UE. That is, the RA preamble is used by the UE alone, not available to other UEs. Since a one-to-one correspondence is established between RA preambles and UEs, there is no collision between UEs. In this case, upon receipt of an RA preamble, the eNB can identify a UE that transmitted the RA preamble, which is efficient.

On the contrary, in the contention-based RA procedure, a UE transmits an RA preamble randomly selected from among available RA preambles. Thus, there is always a probability that a plurality of UEs use the same RA preamble. Therefore, even though the eNB receives a specific RA preamble, the eNB cannot identify a UE that transmitted the specific RA preamble.

A UE performs an RA procedure, 1) when the UE initially accesses an eNB with which an RRC connection has not been established, 2) when the UE initially accesses a target cell during handover, 3) upon request of the eNB, 4) upon generation of uplink data when uplink time synchronization has not been acquired yet or radio resources has not been allocated for requesting radio resources, or 5) when a failed radio link or handover is to be recovered.

Figure 4:
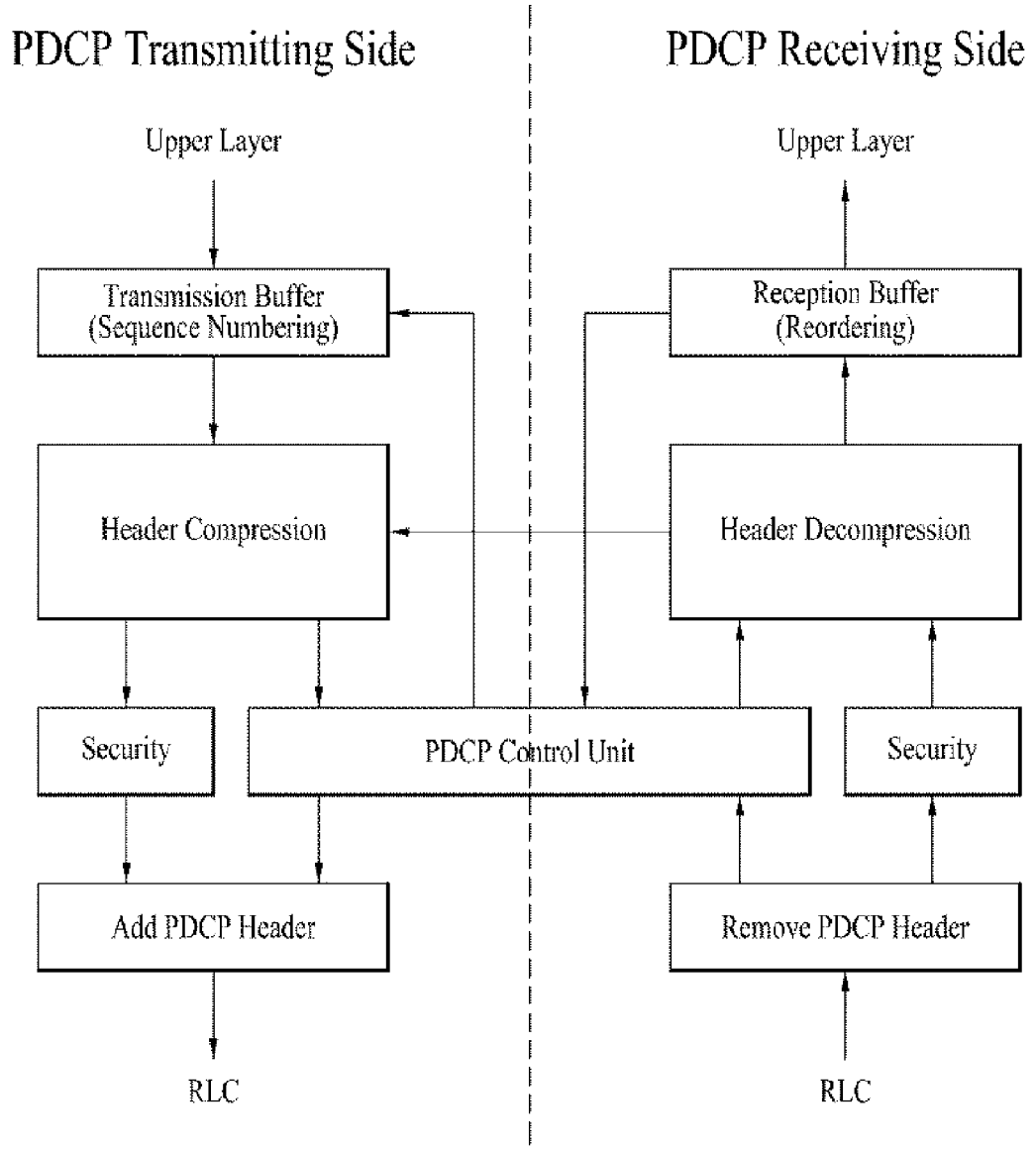
FIG. 4 illustrates the structure of a Packet Data Convergence Protocol (PDCP) layer.

A detailed description will be given of the PDCP layer. FIG. 4 illustrates the structure of the PDCP layer.

Referring to FIG. 4, the PDCP layer is connected to its higher layer, the RRC layer or a user application and to its lower layer, the RLC layer. One PDCP entity supports one RB and a transmitting side and a receiving side exist for one PDCP entity.

In FIG. 4, a PDCP transmitting side configures a PDCP Protocol Data Unit (PDU) with PDCP Service Data Units (SDUs) received from the higher layer or with control information autonomously generated from a PDCP entity and transmits the PDCP PDU to a receiving side of a peer PDCP entity. The PDCP receiving side extracts the PDCP SDUs or control information from the received PDCP PDU.

The transmitting side of the PDCH entity may generate two kinds of PDUs, Data PDU and Control PDU. A PDCP Data PDU is a data block produced by processing SDUs received from the higher layer at the PDCP layer, and a PDCP Control PDU is a data block that the PDCP layer itself generates to transmit control information to the peer PDCP entity.

PDCP Data PDUs are generated for both an SRB and a DRB and some PDCP functions are selectively applied according to a used plane. That is, the header compression function is applied only to DRBs, whereas integrity protection of the security function is applied only to SRBs. In the security function, ciphering is applied to both SRBs and DRBS.

A PDCP Control PDU is generated only for a DRB and the above PDCP functions are not applied to the PDCP Control PDU. Notably, a PDU Type field is added to the PDCP Control PDU to indicate the type of a Control PDU. Since both a PDCP Data PDU and a PDCP Control PDU are generated for a DRB, a D/C field is added in the first bit of the header of a PDCP PDU to indicate whether the PDCP PDU is a Data PDU or a Control PDU. On the other hand, a D/C field is not added to a PDCP Data PDU for an SRB because only PDCP data PDUs are generated for SRBs.

In the illustrated case of FIG. 4, the PDCP transmitting side processes data in the following manner.

1) The PDCP layer stores PDCP SDUs received from the higher layer in a transmission buffer and assigns a sequence number to each of the PDCP SDUs.

2) If a DRB has been set up, the PDCP layer performs header compression for the PDCP SDUs.

3) If an SRB has been set up, the PDCP layer performs integrity protection for the PDCP SDUs.

4) The PDCP layer ciphers data blocks resulting from the step 2) or 3).

5) The PDCP layer constructs a PDCP PDU by adding an appropriate header to the ciphered data blocks and transmits the PDCP PDU to the RLC layer.

The PDCP receiving side in FIG. 4 processes data in the following manner.

1) The PDCP layer removes a header from a received PDCP PDU.

2) The PDCP layer deciphers the header-free PDCP PDU.

3) If a DRB has been set up, the PDCP layer decompresses the header of the deciphered PDCP PDU.

4) If an SRB has been set up, the PDCP layer verifies the integrity of the deciphered PDCP PDU.

5) The PDCP layer transmits data blocks resulting from the step 3) or 4), that is, PDCP SDUs to the higher layer. If an AM DRB has been set up, the PDCP layer stores the PDCP SDUs in a reception buffer, reorders the stored PDCP SDUs, and transmits the reordered PDCP SDUs to the higher layer.

The security function of the PDCP layer will be described in great detail. The security function involves ciphering and integrity protection. For ciphering and integrity protection, a different code is generated for each packet. The original data is ciphered using the code or its integrity is verified using the code.

A packet-specific code is generated using a PDCP SN added to the header of a PDCP PDU. One of code generation factors is 'COUNT'. The 'COUNT' is 32 bits long. The PDCP SN occupies the LSBs of 'COUNT' and a Hyper Frame Number (HFN) occupies the MSBs of 'COUNT'. The PDCP SN has a variable length of 5, 7, or 12 bits according to an RB. Thus, the HFN is also variable in length, such as 27, 25, or 20 bits according to an RB.

Figure 5:
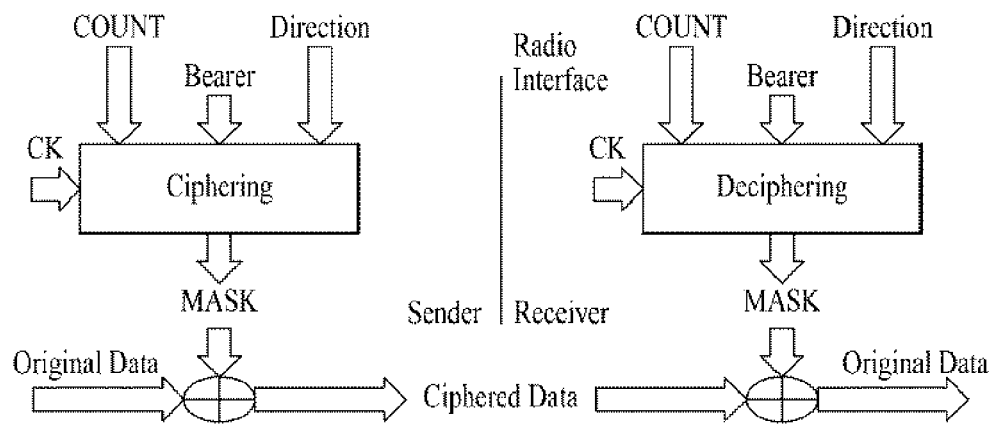
FIG. 5 is a view referred to for describing ciphering at the PDCP layer.

FIG. 5 is a view referred to for describing ciphering at the PDCP layer.

Referring to FIG. 5, a transmitting side generates ciphered data by covering the original data with a mask, that is, a packet-specific code. Covering a mask means bitwise XOR-operation of the original data and the mask. Upon receipt of the ciphered data, a receiving side deciphers the received data to the original data by re-masking the ciphered data.

The mask is 32 bits, created using a plurality of input factors. To generate a different mask for each packet, 'COUNT' is generated using a PDCP SN specific to a PDCP PDU and used as one of the mask generation input factors. Besides 'COUNT', the mask generation input factors are 'Bearer' defined as an RB IDentifier (ID), 'Direction' indicating the direction of transmission, downlink or uplink, and 'Ciphering Key (CK)' being a security key exchanged between a UE and a network during RB setup.

Figure 6:
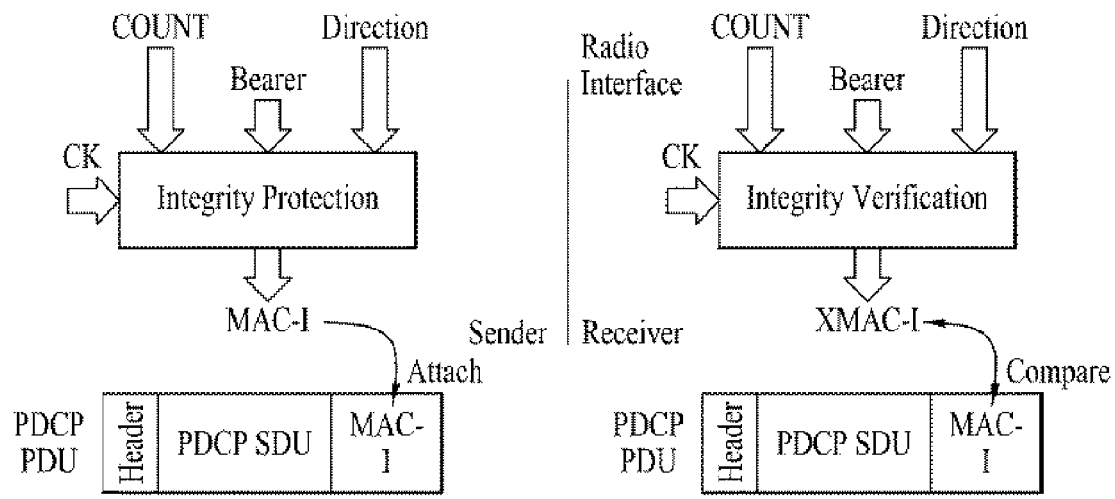
FIG. 6 is a view referred to for describing integrity protection at the PDCP layer.

FIG. 6 is a view referred to for describing integrity protection at the PDCP layer.

Referring to FIG. 6, for integrity protection, a code called Message Authentication Code?Integrity (MAC-I) is generated using PDCP SN-based 'COUNT', 'Bearer', 'Direction', and 'Integrity Protection Key (IK)' being a security key exchanged between a UE and a network during RB setup, as is done for ciphering. Integrity protection is different from ciphering in that the MAC-I is attached to a PDCP PDU, rather than it is XOR-operated with the original data.

For an SRB, a 4-byte MAC-I field is attached to the end of a PDCP PDU. Upon receipt of the PDCP PDU, the receiving side generates an XMAC-I using the same input factors as used in the transmitting side and compares the XMAC-I with the MAC-I attached to the PDCP PDU. If the two values are equal, the receiving side determines that the data is in its integrity. On the contrary, if the two values are different, which implies that the data was modified during transmission, the receiving side determines that the integrity verification of the data fails and reports the integrity verification failure to the higher layer, i.e. the RRC layer so that an RRC connection reestablishment procedure may be performed.

The integrity verification failure is attributed mainly to a data modification (for example, a data insertion or a data replacement) by an intruder or an unauthorized third party, a residual error in a packet that a lower layer fails to detect, and different 'COUNT' values between a transmitting side and a receiving side. If the integrity verification failure occurs because of data modification by an intruder, PDCP state variables are changed by changing a security key and resetting 'COUNT' through RRC connection reestablishment to prevent an intruder from falsifying data any more.

The residual error in a packet that a lower layer fails to detect occurs with a very low probability, 10-6 or below. In this case, problems are confined only to the packet but PDCP state variables are also changed through RRC connection reestablishment.

Finally, the use of different 'COUNT' values between a transmitting side and a receiving side occurs when a wrong PDCP SN is processed due to a PDCP protocol operation error. In this case, the transmitting side and the receiving side have different HFN values corresponding to the MSBs of 'COUNT', thereby causing the integrity verification failure. To make the HFN values of the transmitting side and the receiving side equal, 'COUNT' is reset to 0 through RRC connection reestablishment.

PDCP reestablishment will be described below.

The PDCP layer reestablishes a PDCP entity in response to a command from the RRC layer. The PDCP reestablishment procedure is performed always together with an RLC reestablishment procedure. Before the PDCP reestablishment procedure, a PDCP PDU received through the RLC reestablishment is first processed. The PDCP reestablishment procedure is performed in a different manner according to the type of an RB, as follows.

A) In case of an SRB, the receiving PDCP layer discards a PDCP PDU received from the RLC layer through RLC reestablishment and resets 'COUNT' and its PDCP state variables (i.e. an HFN and a PDCP SN) to 0s.

In addition, the transmitting PDCP layer discards a non-transmitted PDCP SDU buffered in the transmission buffer and changes a security key and a security algorithm as indicated by the RRC layer.

B) In case of a UM DRB, the receiving PDCP layer recovers PDCP SDUs by processing a PDCP PDU received from the RLC layer through RLC reestablishment and transmits the recovered PDCP SDUs to the higher layer and resets a header compression protocol. In addition, the receiving PDCP layer resets 'COUNT' and its associated PDCP state variables (i.e. an HFN and a PDCP SN) to 0s and changes a security key and a security algorithm as indicated by the RRC layer.

The transmitting PDCP layer assigns PDCP SNs to non-transmitted PDCP SDUs remaining in the transmission buffer, starting from 0 and transmits them after PDCP reestablishment.

C) In case of an AM DRB, the receiving PDCP layer recovers PDCP SDUs by processing a PDCP PDU received from the RLC layer through RLC reestablishment, stores the recovered PDCP SDUs in the reception buffer, reorders the stored PDCP SDUs, and resets a header compression protocol. However, the receiving PDCP layer keeps 'COUNT' and its associated PDCP state variables (i.e. an HFN and a PDCP SN) used before PDCP reestablishment and changes a security key and a security algorithm as indicated by the RRC layer.

The transmitting PDCP layer transmits PDCP SDUs remaining in the transmission buffer, which were not transmitted or for which successful or failed transmission were not verified, after PDCP reestablishment. Herein, a PDCP SN used before PDCP reestablishment is still used for transmission of the PDCP SDUs.

The reason for maintaining the 'COUNT' value for the AM DRB during PDCP reestablishment is that PDCP SDUs which were not transmitted successfully prior to the PDCP reestablishment may be retransmitted after the PDCP reestablishment. The PDCP layer may perform PDCP reestablishment during handover. In this case, to ensure lossless transmission of PDCP SDUs, the PDCP SDUs are retransmitted and to support the PDCP SDU retransmission, the 'COUNT' value is maintained.

Now a description will be given of triggering conditions for PDCP reestablishment. A UE performs PDCP reestablishment in two situations, that is, handover and RRC connection reestablishment.

In case of handover-triggered PDCP reestablishment, when a UE receives an 'RCConnectionReconfiguration' message including 'mobilityControlInfo' from an eNB, the UE performs PDCP reestablishment. The 'RCConnectionReconfiguration' message is used for RB reconfiguration, and 'mobilityControlInfo' includes information needed for handover.

Meanwhile, if the UE determines that a serious problem has occurred to an RRC connection, the UE performs RRC connection reestablishment to reestablish the RRC connection to the eNB. After the RRC connection reestablishment, the UE receives an 'RCConnectionReconfiguration' that does not include 'mobilityControlInfo' and performs PDCP reestablishment.

Five reasons for serious problems with an RRC connection are defined as Radio Link Failure, Handover Failure, Mobility from E-UTRA, PDCP Integrity Verification Failure, and RRC Connection Reconfiguration Failure.

If one of the above problems takes place, the UE activates a timer and starts RRC connection reestablishment. During the RRC connection reestablishment, the UE is connected to a new cell through cell selection and an RA procedure. After an RRC connection is successfully reestablished with the new cell, the UE receives an 'RCConnectionReconfiguration' without 'mobilityControlInfo' and reconfigures existing RBs.

Meanwhile, if the channel state between the UE and the eNB is poor, an RN may be installed between them to thereby provide a better radio channel to the UE. The introduction of an RN at a cell edge suffering from a poor channel quality from an eNB may provide a faster data channel and extend cell coverage. RNs are a technology introduced to eliminate propagation shadowing areas in a wireless communication system and this relay technology is widely used. An eNB managing an RN is called a Donor eNB (DeNB). As an RN is introduced, a new interface called a Un interface is defined between the RN and the DeNB, distinguishably from a Uu interface between a UE and a network node such as an RN or an eNB.

Figure 7:
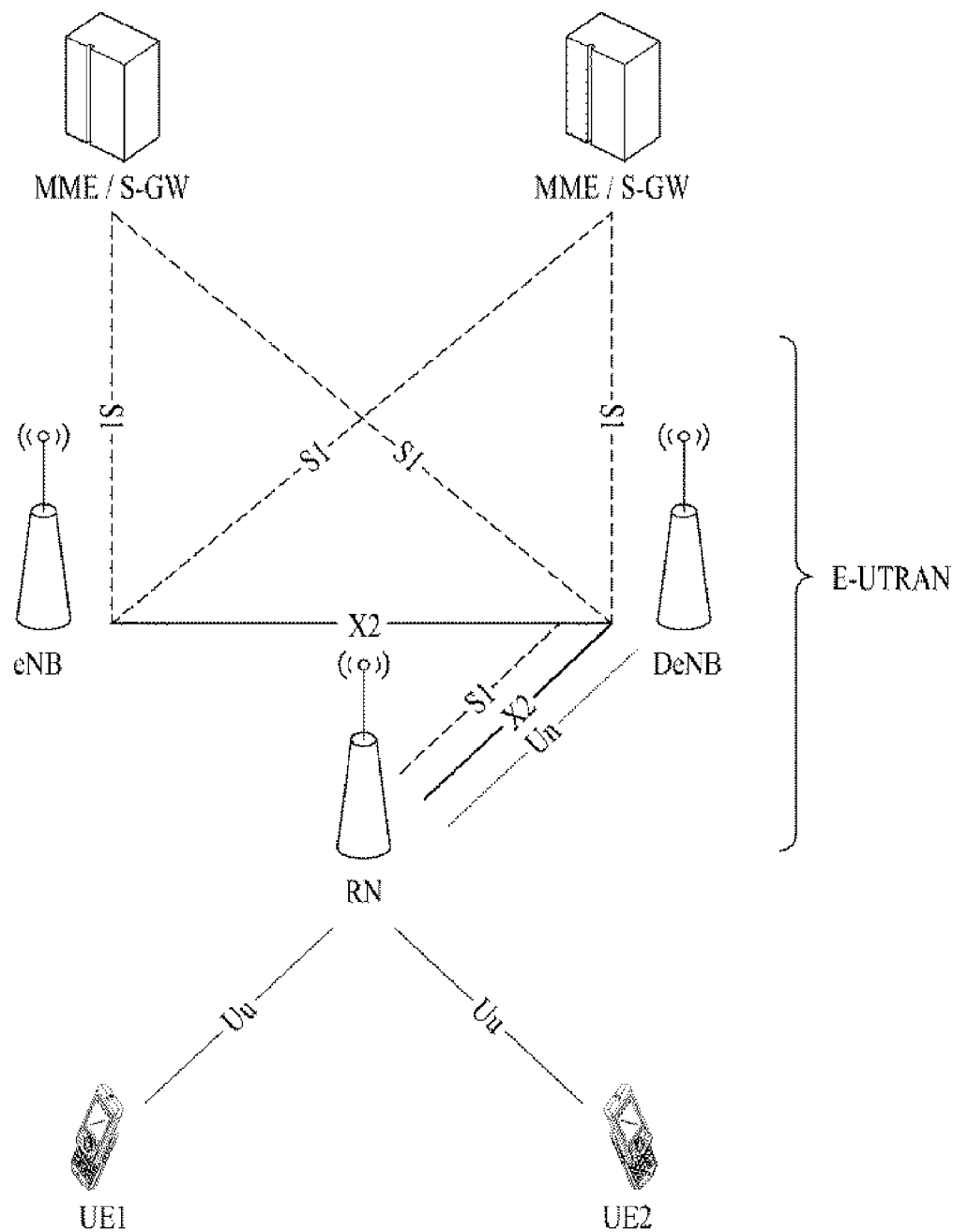
FIG. 7 illustrates the concept of a network including a Relay Node (RN), a Donor evolved Node B (DeNB), and a UE.

FIG. 7 illustrates the concept of a network including an RN, a DeNB, and a UE.

Referring to FIG. 7, the RN manages a UE on behalf of the DeNB. From the perspective of the UE, the RN is perceived as the DeNB. Therefore, the Uu interface between the UE and the RN still uses the Uu interface protocols of the legacy LTE, the MAC, RLC, PDCP, and RRC protocols.

On the part of the DeNB, the RN is seen as a UE or an eNB under circumstances. When the RN initially accesses the DeNB, the DeNB is not aware of the existence of the RN. Therefore, the RN accesses the DeNB through an RA procedure like a UE. Once the RN is connected to the DeNB, the RN operates like an eNB managing its connected UEs. That's why the Un interface uses both Un radio protocols needed for the RN to operate like a UE and network protocols needed for the RN to operate like an eNB.

The Un radio protocols are basically identical to the Uu radio protocols. This is because the RN operates like a UE and thus there is no difference between an RN-eNB operation and a UE-eNB operation. Consequently, the Uu radio protocols with some functions modified are used as the Un radio protocols.

Network protocols refer to protocols used between network nodes, such as an S1 protocol and an X2 protocol. From the perspective of the network, an RN operates as a network node and thus the existing S1 protocol and X2 protocol are still applied to the RN. That is, the RN supports the S1 protocol used for communication with an MME or an S-GW and the X2 protocol used for communication with an eNB, on the Un interface being an air interface.

Figure 8:
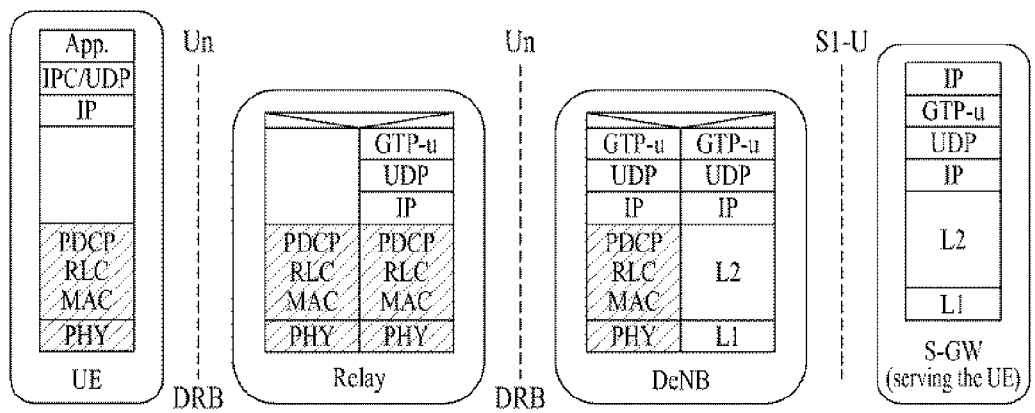
FIGS. 8 and 9 illustrate protocol architectures applied to an RN.
Figure 9:
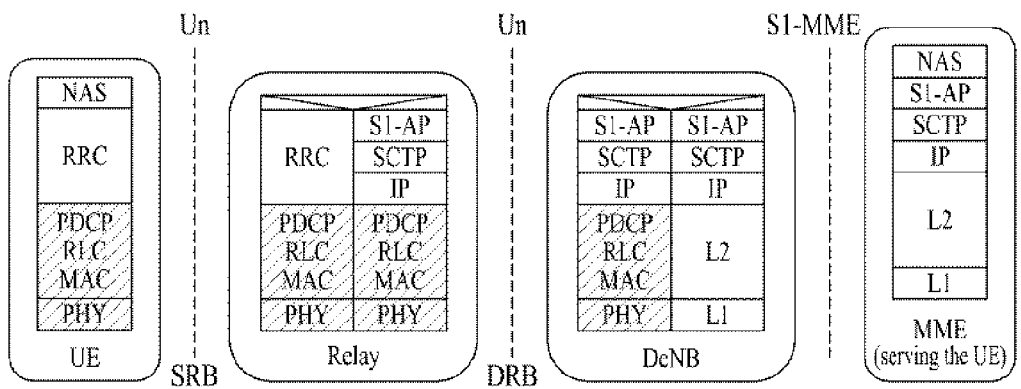

FIGS. 8 and 9 illustrate protocol architectures applied to an RN. Specifically, FIG. 8 illustrates a user-plane protocol architecture and FIG. 9 illustrates a control-plane protocol architecture.

Referring to FIGS. 8 and 9, if an RN is described in terms of a protocol architecture, both user-plane data and control-plane data are transmitted on a DRB via the Un interface. That is, since an S1-AP (or X2-AP) message is transmitted through an IP layer like user data, the PDCP layer transmits the S1-AP message on a DRB, like user data. Since integrity protection is very important for a control message such as the S1-AP or X2-AP message, integrity protection is applied specially to DRBs on the Un interface.

As described above, integrity protection is applied to an AM DRB that delivers a control message such as an S1-AP message via a Un interface between an RN and a DeNB. Accordingly, a receiving side verifies the integrity of a received PDCP PDU. If the integrity verification is failed, the PDCP layer reports the integrity verification failure to the RRC layer and the RRC layer performs RRC connection reestablishment to thereby solve the integrity verification failure.

However, even though RRC connection reestablishment is performed for an AM DRB, a 'COUNT' value is kept unchanged. That is, although a security key may be changed, PDCP state parameters such as an HFN and a PDCP SN are still the same before and after PDCP reestablishment.

If the integrity verification failure is caused by different 'COUNT' values between the transmitting side and the receiving side, the wrong 'COUNT' values are still kept for the AM DRB despite the RRC connection reestablishment. As a consequence, the integrity verification failure also occurs to a PDCP PDU received after the RRC connection reestablishment. That is, when the integrity verification failure occurs to an AM DRB in view of a mismatch between 'COUNT' values, the integrity verification failure is repeated in the order of "integrity verification failure? RRC connection reestablishment ? . . . RRC connection reconfiguration ? PDCP reestablishment ? integrity verification failure ? . . . ". The integrity verification failure cannot be overcome until the RN itself releases the RRC connection, transitions to idle mode, and configures a new RRC connection in the idle mode.

In this context, the present invention provides a method for resetting 'COUNT', that is, an HFN and a PDCP SN during PDCP reestablishment in order to solve the problem of repeated integrity verification failures caused by different 'COUNT' values between a transmitting side and a receiving side for an AM DRB which is subjected to integrity verification. Rather than the 'COUNT' value is always reset for every AM DRB, it is reset only for an AM DRB requiring 'COUNT' reset and the 'COUNT' value is maintained for the remaining AM DRBs as is done conventionally, to thereby support lossless handover. To achieve this object, Embodiment 1 and Embodiment 2 are provided according to the present invention.

Embodiment 1

When an RN starts RRC connection reestablishment, it notifies a DeNB whether the RRC connection reestablishment has been triggered by an integrity verification failure. For this purpose, the RN transmits to the DeNB an RRC connection reestablishment request message or RRC connection reestablishment complete message with a Reestablishment Cause field set to Integrity Failure, thereby notifying whether the DeNB should reset a 'COUNT' value for an AM DRB.

If the RN sets Reestablishment Cause to Integrity Failure, the DeNB resets a 'COUNT' value for every AM DRB during PDCP reestablishment. On the other hand, if Reestablishment Cause is not Integrity Failure, the DeNB maintains the 'COUNT' value for the AM DRB during PDCP reestablishment.

In addition, the RN may notify the DeNB of the ID of the AM DRB whose integrity verification has been failed. In this case, the RN resets the 'COUNT' value for the AM DRB to which integrity verification failure has occurred, not for every AM DRB.

Meanwhile, the RN may notify the DeNB only of the occurrence of the integrity verification failure and follow a command from the DeNB as to whether to reset the 'COUNT' value for the AM DRB. That is, upon receipt of an RRC connection reestablishment request message or RRC connection reestablishment complete message from the RN, the DeNB determines whether an integrity verification failure has occurred to the RN based on Reestablishment Cause set in the received message and determines whether to reset the 'COUNT' value for the AM DRB. Subsequently, when transmitting an RRC connection reconfiguration message to the RN, the DeNB notifies the RN whether to reset the 'COUNT' value for the AM DRB. For this purpose, an indicator indicating whether to reset a 'COUNT' value for an AM DRB may be added to the RRC connection reconfiguration message. Then the RN may reset or maintain the 'COUNT' value according to the indicator.

The indicator indicating whether to reset a 'COUNT' value may be set for each AM DRB. That is, a 1-bit indicator indicating whether to reset a 'COUNT' value for each AM DRB may be added to the RRC connection reconfiguration message.

Resetting a 'COUNT' value means that the transmitting side sets Next_PDCP_TX_SN=0 and TX_HFN=0 and the receiving side sets Last_Submitted_PDCP_RX_SN=4095, Next_PDCP_RX_SN=0, and RX_HFN=0. However, when other specific values need to be set, the DeNB may notify the RN of the specific values. In this case, one specific value may be notified for all AM DRBs or each individual AM DRB.

Embodiment 2

The RN resets or maintains a 'COUNT' value for an AM DRB according to the cause of PDCP reestablishment. That is, if PDCP reestablishment has been triggered by handover, the 'COUNT' value is maintained. If PDCP reestablishment has been triggered by a factor other than handover, the 'COUNT' value is reset.

A decision is made as to whether PDCP reestablishment has been triggered by handover or any other factor, based on the presence or absence of handover information 'mobilityControlInfo' in an RRC connection reconfiguration message. In the presence of 'mobilityControlInfo' in a received RRC connection reconfiguration message, the RN determines that handover has occurred and maintains the 'COUNT' value during PDCP reestablishment. On the contrary, if 'mobilityControlInfo' is not included in the received RRC connection reconfiguration message, the RN determines that handover has not occurred and resets the 'COUNT' value during PDCP reestablishment.

In another method, the 'COUNT' value for the AM DRB may be reset depending on whether RRC connection reestablishment was performed before the RRC connection reconfiguration message has been received. That is, since the RRC connection reconfiguration message is received without RRC connection reestablishment during handover, the RN resets the 'COUNT' value for the AM DRB only when the RRC connection reestablishment was performed shortly before reception of the RRC connection reconfiguration message.

In a further method, the RN may determine whether to reset the 'COUNT' value for the AM DRB depending on whether RRC connection reestablishment has been triggered by the integrity verification failure of any RB or any other factor. That is, if the RRC connection reestablishment has been triggered by the integrity verification failure of any RB, the RN resets the 'COUNT' value for the AM DRB during PDCP reestablishment. If the RRC connection reestablishment has been triggered by a factor other than the integrity verification failure of any RB, the RB does not reset the 'COUNT' value for the AM DRB. When resetting 'COUNT', the RN may reset only the 'COUNT' value for the AM DRB to which the integrity verification failure occurred or a 'COUNT' value for every AM DRB.

In a final method, the RN may determine whether to reset the 'COUNT' value for the AM DRB depending on whether RRC connection reestablishment has been triggered by the integrity verification failure of the AM DRB or any other factor. That is, if the RRC connection reestablishment has been triggered by the integrity verification failure of the AM DRB, the RN resets the 'COUNT' value for the AM DRB during PDCP reestablishment. If the RRC connection reestablishment has been triggered by a factor other than the integrity verification failure of the AM DRB, the RN maintains the 'COUNT' value for the AM DRB. As stated before, only the 'COUNT' value for the AM DRB to which the integrity verification failure occurred may be reset or a 'COUNT' value for every AM DRB may be reset.

Figure 10:
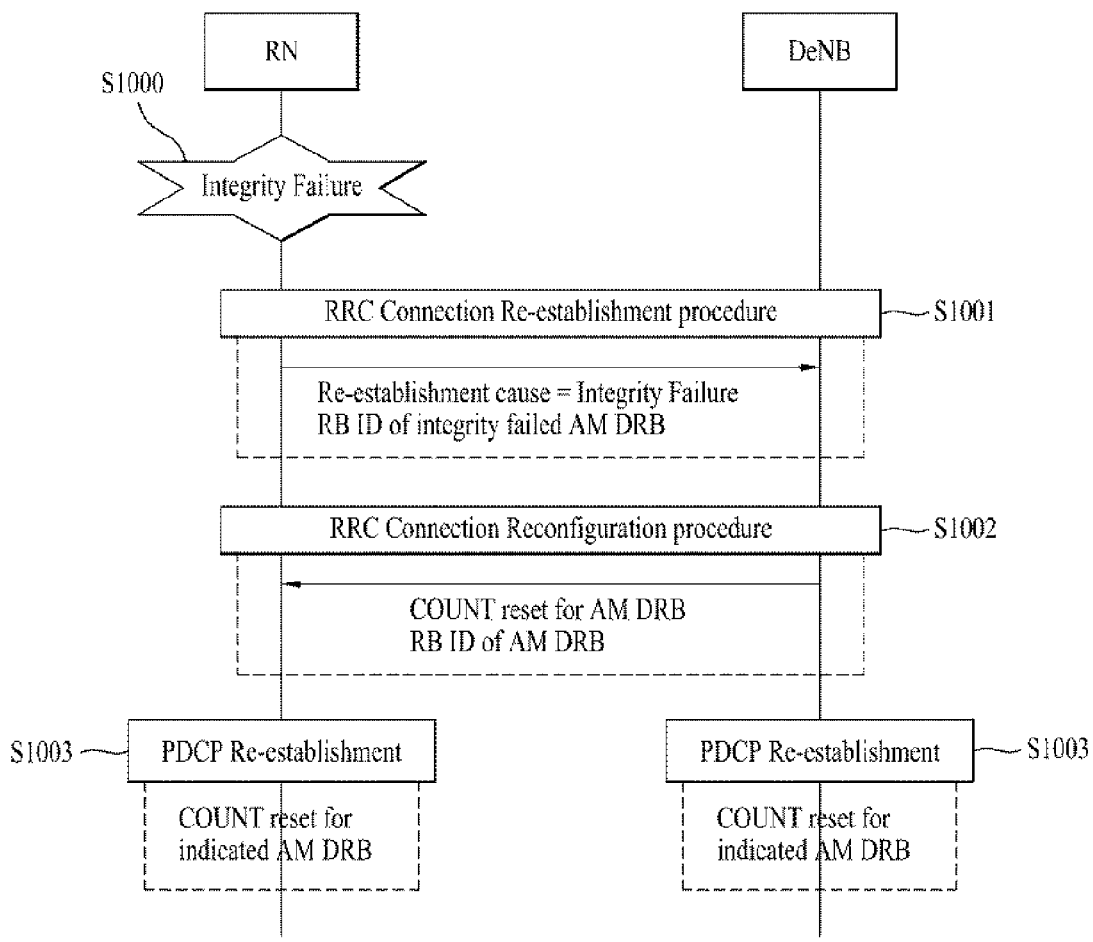
FIG. 10 is a diagram illustrating a signal flow for a method for resetting a 'COUNT' value for an Acknowledged Mode (AM) Data Radio Bearer (DRB) according to an embodiment of the present invention.

FIG. 10 is a diagram illustrating a signal flow for a method for resetting a 'COUNT' value for an AM DRB according to an embodiment of the present invention.

Referring to FIG. 10, the PDCP layer of an RN detects the integrity verification failure of a PDCP PDU on an AM DRB (S1000). Then, the PDCP layer of the RN reports the occurrence of the integrity verification failure of the PDCP PDU on the AM DRB to the RRC layer.

The RN performs an RRC connection reestablishment procedure (S1001). In this case, the RN transmits to a DeNB an RRC connection reestablishment request message or RRC connection reestablishment complete message with a Reestablishment Cause field set to Integrity Failure. The RN may also notify the DeNB of the ID of the AM DRB to which the integrity verification failure occurred.

Upon completion of the RRC connection reestablishment procedure, the DeNB starts an RRC connection reconfiguration procedure, determines whether an integrity verification failure has occurred to the RN based on the Reestablishment Cause set in the RRC connection reestablishment request message or RRC connection reestablishment complete message, and determines whether to reset a 'COUNT' value for the AM DRB (S1002).

Then, the DeNB transmits to the RN an RRC connection reconfiguration message including an indicator indicating whether to reset the 'COUNT' value for the AM DRB of the RN (S1003). Herein, the RRC connection reconfiguration message preferably includes 'mobilityControlInfo'. An indicator indicating whether to reset a 'COUNT' value may be set for each AM DRB.

Upon receipt of an RRC connection reconfiguration message without 'mobilityControlInfo', the RRC layer of the RN commands start of a PDCP reestablishment procedure, while resetting the 'COUNT' value according to the indicator (S1003). That is, an HFN and a PDCP SN may be set to 0.

According to the embodiments of the present invention, during PDCP reestablishment for an AM DRB, a 'COUNT' value for the AM DRB is reset when an integrity verification failure has occurred to the AM DRB and the 'COUNT' value for the AM DRB is maintained in any other case. Therefore, security error-caused continuous RRC connection reestablishment can be prevented, while lossless handover is ensured for the AM DRB.

Figure 11:
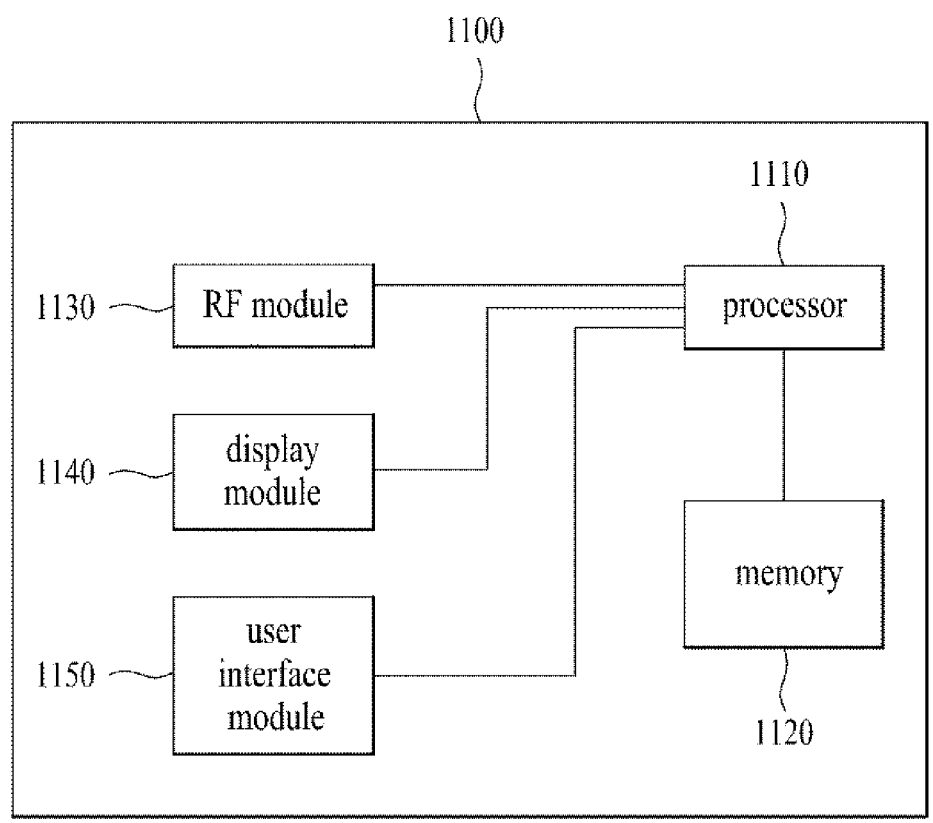
FIG. 11 is a block diagram of a communication apparatus according to an embodiment of the present invention.

FIG. 11 is a block diagram of a communication apparatus according to an embodiment of the present invention.

Referring to FIG. 11, a communication apparatus 1100 includes a processor 1110, a memory 1120, a Radio Frequency (RF) module 1130, a display module 1140, and a user interface module 1150.

For the convenience's sake of description, the communication apparatus 110 is shown as including the components in FIG. 11. Thus, some modules may be omitted from or added to the communication apparatus 1100, when needed. In addition, a module in the communication apparatus 1100 may be configured into separate modules. The processor 1110 is configured to perform operations according to the embodiments of the present invention described before with reference to the drawings. Specifically, for a detailed description of operations of the processor 1110, descriptions made with reference to FIGS. 1 to 10 may be referred to.

The memory 1120 is connected to the processor 1110 and stores an Operating System (OS), applications, program code, and data. The RF module 1130 is connected to the processor 1110 and functions to convert a baseband signal to an RF signal or an RF signal to a baseband signal. For this purpose, the RF module 1130 performs analog conversion, amplification, filtering, and frequency upconversion, or performs these processes reversely. The display module 1140 is connected to the processor 1110 and displays various types of information. The display module 1140 may be configured with, but not limited to, known components such as a Liquid Crystal Display (LCD), a Light Emitting Diode LED), and an Organic Light Emitting Diode (OLED). The user interface module 1150 is connected to the processor 1110 and may be configured using known user interfaces such as a keypad, a touch screen, etc. in combination.

The above-described method and apparatus for reconfiguring a connection to a BS at an RN in a wireless communication system are applicable to other various wireless communication systems as well as a 3GPP LTE system.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship among a BS and a UE. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term, fixed station, Node B, 'eNode B (eNB), access point, etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method of processing a signal by a relay node in a wireless communication system, the method comprising:
   transmitting, by the relay node to a network, a first message associated with a connection reestablishment, wherein the first message includes an indicator indicating a connection reestablishment cause;
   receiving, by the relay node, a second message associated with the connection reestablishment;
   when the indicator indicates integrity failure on an acknowledged mode (AM) data radio bearer (DRB) as the connection establishment cause, resetting, by the relay node, a value of at least one packet data convergence protocol (PDCP) state variable associated with the AM DRB to a predetermined value according to the second message for consistency of the value of the at least one PDCP state variable between the relay node and the network,
   wherein the second message includes a command for resetting the at least one PDCP state variable associated with the AM DRB; and
   when the indicator indicates connection reestablishment cause other than the integrity failure on the AM DRB, maintaining the value of the at least one PDCP state variable,
   wherein the AM DRB is used for carrying at least control information from the network.

2. The method of claim 1, wherein the at least one PDCP state variable includes a Hyper Frame Number (HFN) and a PDCP Sequence Number (SN).

3. The method of claim 1, wherein the predetermined value is 0.5.

4. The method of claim 1, wherein the predetermined value is determined by the network.

5. The method of claim 1, wherein the first message includes an indication indicating an identity of a radio bearer in which the integrity failure occurred.

6. The method of claim 1, wherein the first message is a Radio Resource Control (RRC) connection reestablishment request message or an RRC connection reestablishment complete message.

7. The method of claim 1, wherein the second message is a Radio Resource Control (RRC) connection reconfiguration message.

8. The method of claim 5, wherein the second message includes the indication indicating the identity of a specific AM DRB in which the integrity failure occurred, and the value of the at least one PDCP state variable is reset only for the specific AM DRB in which the integrity failure occurred.

9. A relay node in a wireless communication system, the relay node comprising:
   a transmitter configured to transmit, to a network, a first message associated with a connection reestablishment, the first message including an indicator indicating a connection reestablishment cause;
   a receiver configured to receive a second message associated with the connection reestablishment; and
   a processor operatively connected to the receiver and the transmitter,
   wherein when the indicator indicates integrity failure on an acknowledged mode (AM) data radio bearer (DRB) as the connection establishment cause, the processor is configured to reset a value of at least one packet data convergence protocol (PDCP) state variable associated with the AM DRB to a predetermined value according to the second message for consistency of the value of the at least one PDCP state variable between the relay node and the network,
   wherein the second message includes a command for resetting the at least one PDCP state variable associated with the AM DRB,
   wherein when the indicator indicates connection reestablishment cause other than the integrity failure on the AM DRB, the processor is configured to maintain the value of the at least one PDCP state variable, and
   wherein the AM DRB is used for carrying at least control information from the network.

* * * * *